(12) United States Patent
Ball

(10) Patent No.: US 11,277,002 B2
(45) Date of Patent: Mar. 15, 2022

(54) SURGE PROTECTION DEVICE FOR THE PROTECTION OF MULTIPLE DC OR AC POWER LINES

(71) Applicant: MERSEN USA EP Corp., Boonton, NJ (US)

(72) Inventor: Roy Ball, Coral Springs, FL (US)

(73) Assignee: MERSEN USA EP Corp., Boonton, NJ (US)

( * ) Notice: Subject to any disclaimer, the term of this patent is extended or adjusted under 35 U.S.C. 154(b) by 0 days.

(21) Appl. No.: 16/871,331

(22) Filed: May 11, 2020

(65) Prior Publication Data

US 2020/0366087 A1    Nov. 19, 2020

Related U.S. Application Data

(60) Provisional application No. 62/847,005, filed on May 13, 2019.

(51) Int. Cl.
| | | |
|---|---|---|
| *H02H 9/04* | (2006.01) | |
| *H02H 9/00* | (2006.01) | |
| *H02H 3/22* | (2006.01) | |
| *H02H 3/04* | (2006.01) | |
| *H02H 3/20* | (2006.01) | |

(52) U.S. Cl.
CPC .............. *H02H 9/04* (2013.01); *H02H 9/005* (2013.01); *H02H 3/048* (2013.01); *H02H 3/20* (2013.01); *H02H 3/22* (2013.01); *H02H 9/042* (2013.01)

(58) Field of Classification Search
CPC ............ H02H 9/04; H02H 9/00; H02H 9/005; H02H 9/042; H02H 3/048; H02H 3/20; H02H 3/22

USPC .................................................. 361/117–120
See application file for complete search history.

(56) References Cited

U.S. PATENT DOCUMENTS

| | | | |
|---|---|---|---|
| 3,771,022 A | 11/1973 | Isokawa | |
| 4,878,145 A | 10/1989 | Lace | |
| 5,038,245 A | 8/1991 | Gronskog | |
| 5,610,793 A * | 3/1997 | Luu | H02H 9/042 361/111 |
| 5,646,810 A * | 7/1997 | Funke | H02H 9/04 361/111 |
| 7,245,511 B2 | 7/2007 | Lancaster et al. | |
| 7,791,855 B2 | 9/2010 | Carcouet et al. | |

(Continued)

FOREIGN PATENT DOCUMENTS

| | | |
|---|---|---|
| CN | 201813148 U | 4/2011 |
| CN | 203932994 U | 11/2014 |

(Continued)

OTHER PUBLICATIONS

International Search Report and Written Opinion dated Jul. 28, 2020 in related/corresponding PCT Application No. PCT/US2020/032453, filed May 12, 2020.

*Primary Examiner* — Danny Nguyen
(74) *Attorney, Agent, or Firm* — Kusner & Jaffe

(57) ABSTRACT

A circuit arrangement for a surge protection device for protecting multiple DC or AC power lines. The circuit arrangement includes a plurality of DC or AC power line inputs, a negative potential or neutral input, a ground potential input, a surge protection component having one or more surge elements, a rectification circuit including a plurality of diodes, and an alarm circuit for receiving a status output from the surge protection component.

13 Claims, 16 Drawing Sheets

(56) References Cited

U.S. PATENT DOCUMENTS

| | | | |
|---|---|---|---|
| 8,013,466 B1* | 9/2011 | Thompson | H02J 1/00 |
| | | | 307/1 |
| 9,048,662 B2 | 6/2015 | Bartel et al. | |
| 2005/0122655 A1 | 6/2005 | Hotchkiss | |
| 2012/0154167 A1* | 6/2012 | Jones | H02H 9/042 |
| | | | 340/815.45 |
| 2012/0218668 A1* | 8/2012 | Kidger | H02H 9/005 |
| | | | 361/18 |

FOREIGN PATENT DOCUMENTS

| | | |
|---|---|---|
| CN | 105068636 A | 11/2015 |
| CN | 105098748 B | 11/2015 |
| CN | 207782406 U | 8/2018 |
| EP | 0046408 A1 | 2/1982 |
| EP | 0050966 A1 | 5/1982 |
| EP | 0185777 A1 | 7/1986 |
| JP | 5697263 B2 | 1/2014 |

\* cited by examiner

SURGE PROTECTION DEVICE FOR THE PROTECTION OF MULTIPLE DC OR AC POWER LINES

RELATED APPLICATIONS

This application claims the benefit of U.S. Provisional Application No. 62/847,005 filed May 13, 2019, which is hereby fully incorporated herein by reference.

FIELD OF THE INVENTION

The present invention relates generally to the field of voltage surge protection in both DC and AC power systems, and more specifically to a circuit arrangement for a surge protection device for protecting multiple DC or AC power lines.

BACKGROUND OF THE INVENTION

With the proliferation of low voltage direct current (DC) in applications such as solar, data centers, electric vehicle charging stations, heating and air conditioning system, as well as many residential power systems, there is an increasing need for surge protection to appropriately protect such devices from power surges. A power surge (also referred to as a "voltage surge" or "transient voltage") is an electrical transient, a short duration, high-energy impulse that is imparted on the normal electrical power system whenever there is a sudden electrical charge coupled into the electrical circuit. A power surge can originate from a variety of sources, both internal and external to an installed location, whether it is a residence, commercial building, solar array, or industrial facility.

A device that offers surge protection is a surge protection device or more commonly referred to as an SPD. An SPD is typically designed for either AC or DC applications.

The component that absorbs and passes a voltage surge inside an SPD is often referred to as a surge element. Surge elements include, but are not limited to, a metal oxide varistor (MOV), a transient voltage suppressor (TVS) diode, a thyristor surge protection device (TSPD), a gas discharge tube (GDT) and a spark gap overvoltage suppressor. Each SPD may include a plurality of surge elements connected in series, parallel, or a combination of series/parallel to achieve a particular surge rating for the SPD.

FIG. 1 is a circuit diagram illustrating an exemplary prior art SPD 10 designed to protect a DC power system having multiple DC power lines. In this illustrative embodiment of a prior art SPD the surge elements 14 takes the form of MOVs (metal-oxide varistors). However, it should be appreciated that the surge elements of prior art SPDs may take other forms. The negative potential (N) is common between the five DC power lines (L1-L5). The five DC power lines are isolated from earth ground (G). Each of the five surge elements 14 have a respective status output 16 for indicating whether the respective surge element has failed. SPD 10 also includes an alarm circuit 25 for outputting an external alarm signal indicative of the status of SPD 10. The status outputs 16 of the five surge elements 14 are summed by alarm circuit 25. If the summation of status outputs 16 indicates that one or more of surge elements 14 has failed (i.e., a surge condition has occurred), then alarm circuit 25 provides an alarm signal by switching the alarm output. In the illustrated example, alarm circuit 25 has a normally open (NO) terminal, a normally closed (NC) terminal, and a common (COM) terminal for connection with an external circuit.

One of the drawbacks of existing prior art SPDs is that separate surge elements are respectively required between each DC power line (L1-L5) and the negative potential (N), and a separate surge element is required between the negative potential (N) and ground potential (G). Thus, SPD 10 requires a total of six surge elements 14 in order to protect a DC power system having 5 DC power lines. The need for this large number of surge elements makes the SPD costly to manufacture and requires a significant amount of space inside a housing for the SPD.

The above-described drawbacks in SPDs designed for DC applications are also present with respect to existing SPDs designed for AC applications for use in protection of multi-line, multiphase AC power systems.

The present invention overcomes these and other drawbacks of prior art SPDs to provide an SPD with a reduced number of surge elements for protection of multi-line DC and AC power systems.

SUMMARY OF THE INVENTION

In accordance with the present invention, there is provided a surge protection device, comprising: a plurality of power line inputs; a negative potential or neutral input; a ground potential input; a surge protection component having one or more surge elements; a rectification circuit including a plurality of diodes, wherein said rectification circuit is connected between said inputs and the surge protection component.

In accordance with another aspect of the present invention, there is provided a surge protection device, comprising: a plurality of AC multi-phase line inputs; a neutral input; a ground potential input; a plurality of surge protection components, each surge protection component having one or more surge elements; and a rectification circuit including a plurality of diodes, wherein said rectification circuit is connected between said line inputs and the surge protection component.

An advantage of the present invention is the provision of a SPD that requires fewer surge elements to protect multiple DC or AC power lines.

Another advantage of the present invention is the provision of a SPD that can be manufactured at a lower cost.

Still another advantage of the present invention is the provision of a SPD that minimizes space requirements for an SPD housing.

Yet another advantage of the present invention is the provision of a SPD that can be implemented with less circuitry to indicate a status condition of the SPD.

These and other advantages will become apparent from the following description of illustrated embodiments taken together with the accompanying drawings and the appended claims.

BRIEF DESCRIPTION OF THE DRAWINGS

The invention may take physical form in certain parts and arrangement of parts, embodiments of which will be described in detail in the specification and illustrated in the accompanying drawings which form a part hereof, and wherein.

DETAILED DESCRIPTION OF THE INVENTION

Figure 1:
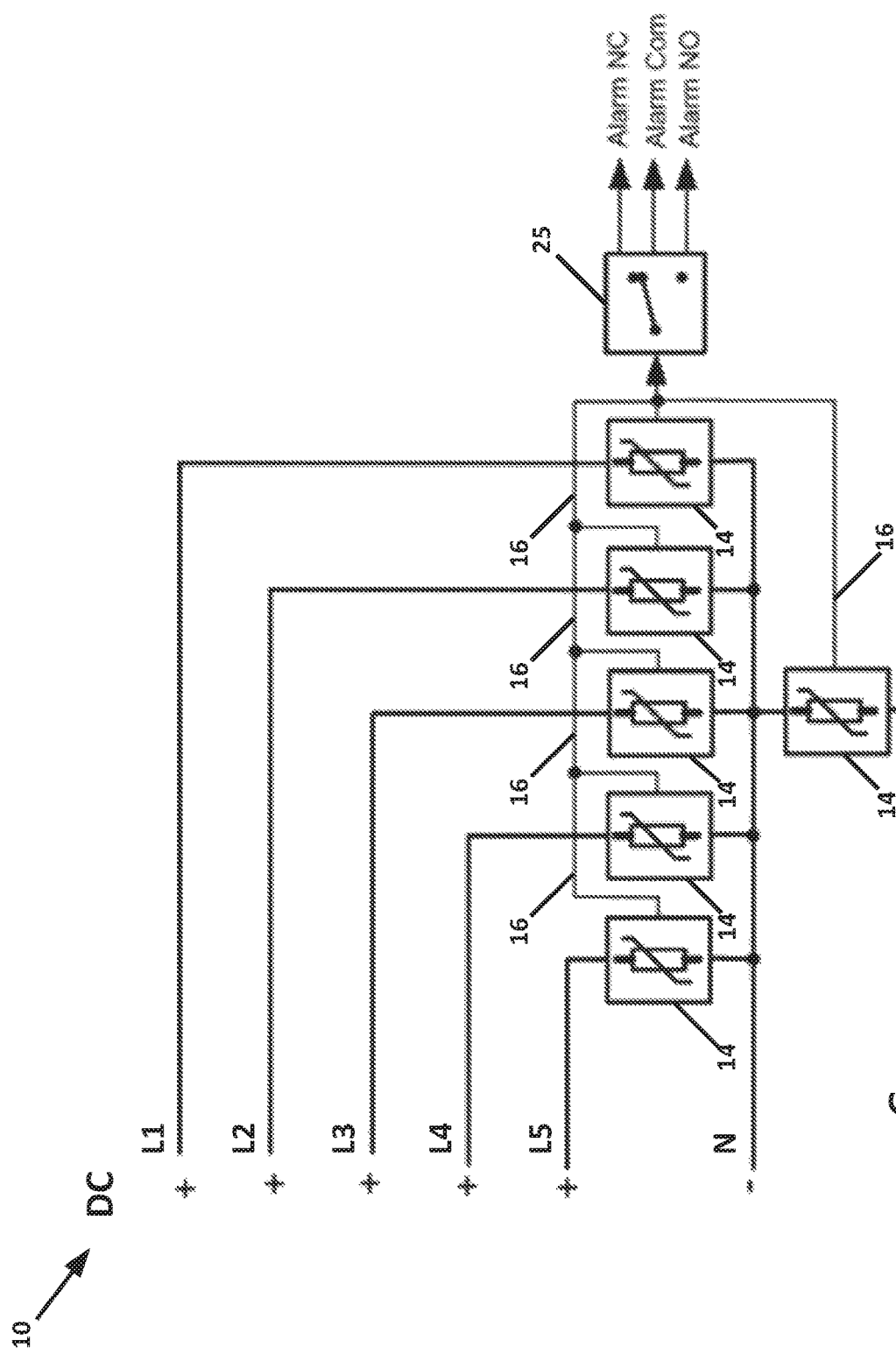
FIG. 1 is a circuit diagram illustrating an exemplary prior art SPD for protecting a DC power system having five DC power lines.
Figure 2:
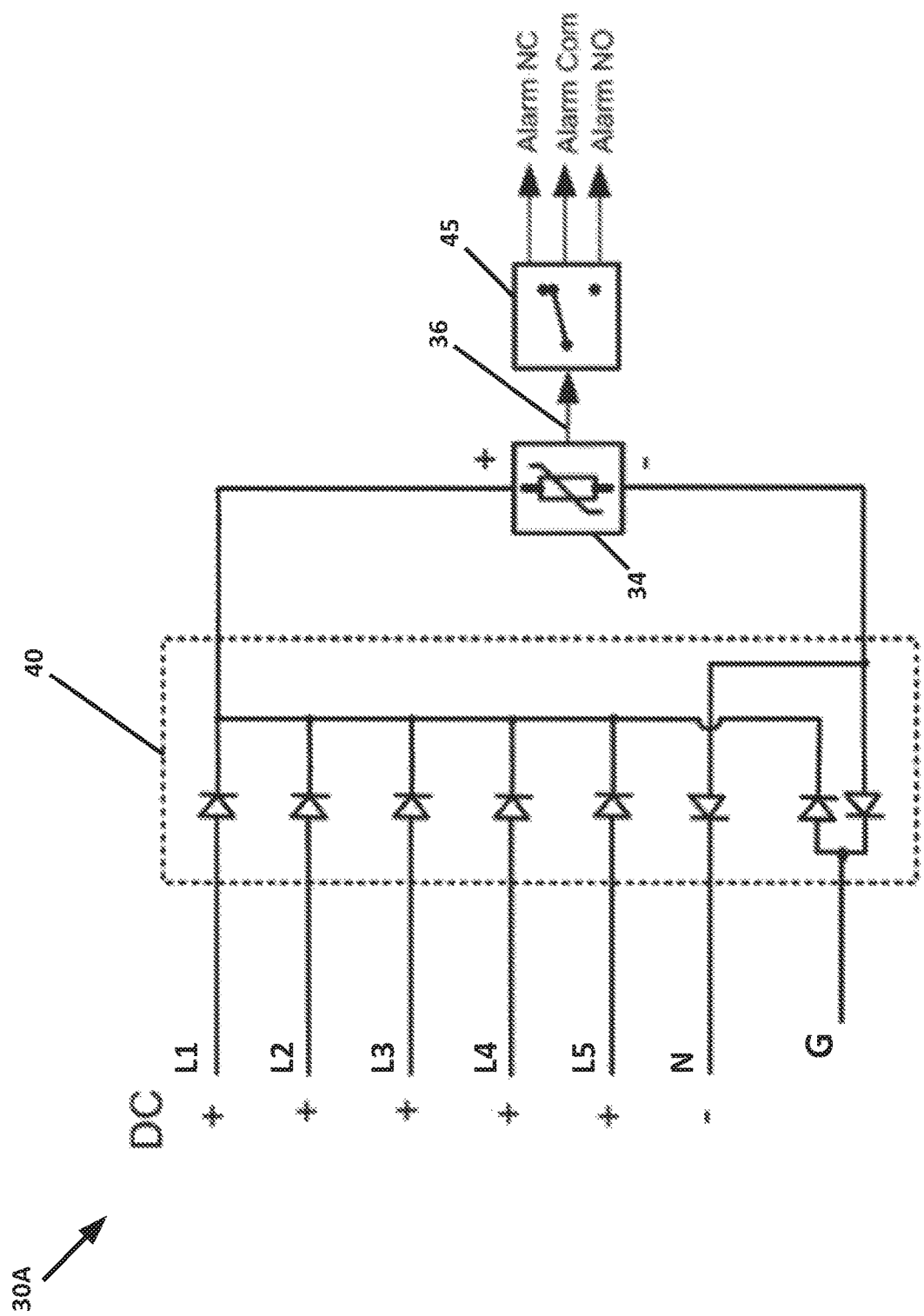
FIG. 2 is a circuit diagram illustrating a SPD according to a first embodiment of the present invention, as configured for protecting a DC power system from positive voltage surges, wherein the DC power system is comprised of a plurality of DC power lines.

Referring now to the drawings wherein the showings are for the purposes of illustrating an embodiment of the invention only and not for the purposes of limiting same, FIG. 2 is a circuit diagram illustrating a SPD 30A according to a first embodiment of the present invention, as configured for protecting a DC power system having a plurality of DC power lines. In the illustrated embodiment of the present invention SPD 30A is configured to protect a DC power system having up to five DC power lines. It should be appreciated that SPD 30A of the present invention may be alternatively configured for protection of greater or fewer than five DC power lines.

As illustrated, SPD 30A is generally comprised of inputs for (i) DC power lines (ii) negative potential N, and (iii) ground potential G; a rectification circuit 40; a surge protection component 34 having a status output 36; and an alarm circuit 45. SPD 30A is adapted to handle positive voltage surges.

Rectification circuit 40 is comprised of a plurality of diodes associated with the inputs of SPD 30A. The anode and cathode terminals of the diodes are oriented such that SPD 30A is adapted to provide protection from positive voltage surges.

Surge protection component 34 is comprised of one or more surge elements. In the illustrated embodiment, the surge element takes the form of a single metal oxide varistor (MOV). However, it should be appreciated that the surge element of surge protection component 34 may take other forms, including, but not limited to, a transient voltage suppressor (TVS) diode, a thyristor surge protection device (ISM), a gas discharge tube (GDT), a spark gap overvoltage suppressor, and the like. It should be understood that surge protection component 34 may be comprised of a plurality of surge elements connected in series, parallel, or a combination of series/parallel to achieve a particular surge rating.

In the operation of SPD 30A, the diodes of rectification circuit 40 steer overvoltage current above the turn-on threshold of the surge protection component 34 to the one or more surge elements thereof.

In the illustrated embodiment, alarm circuit 45 is configured with normally closed (NC), common, and normally open (NO) outputs for connection with a remote status indicator used to provide a visual and/or audible alarm to alert the user of a surge event.

Figure 3:
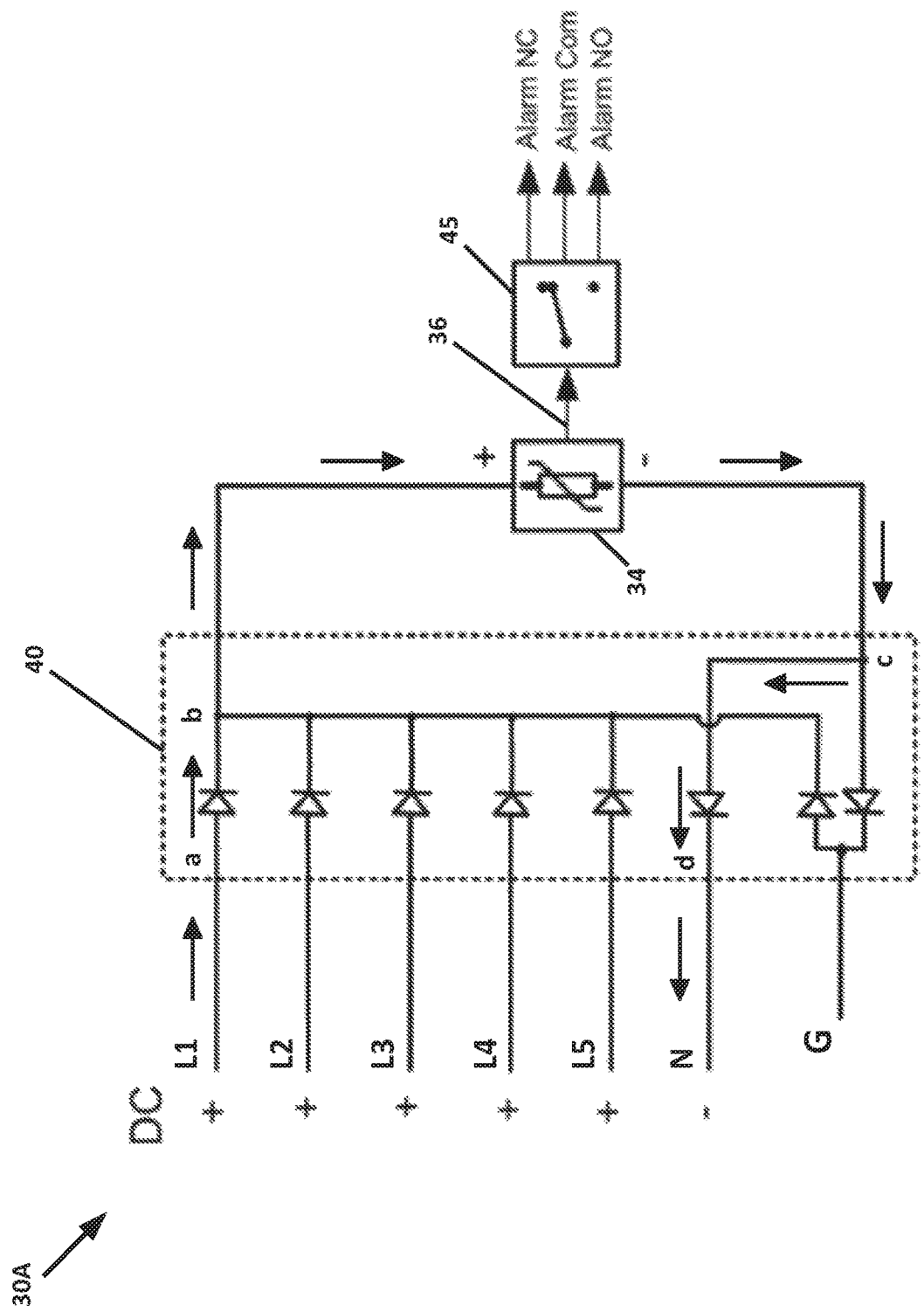
FIG. 3 illustrates the current flow for the SPD shown in FIG. 2 for a positive voltage surge between a DC power line and negative potential N.
Figure 4:
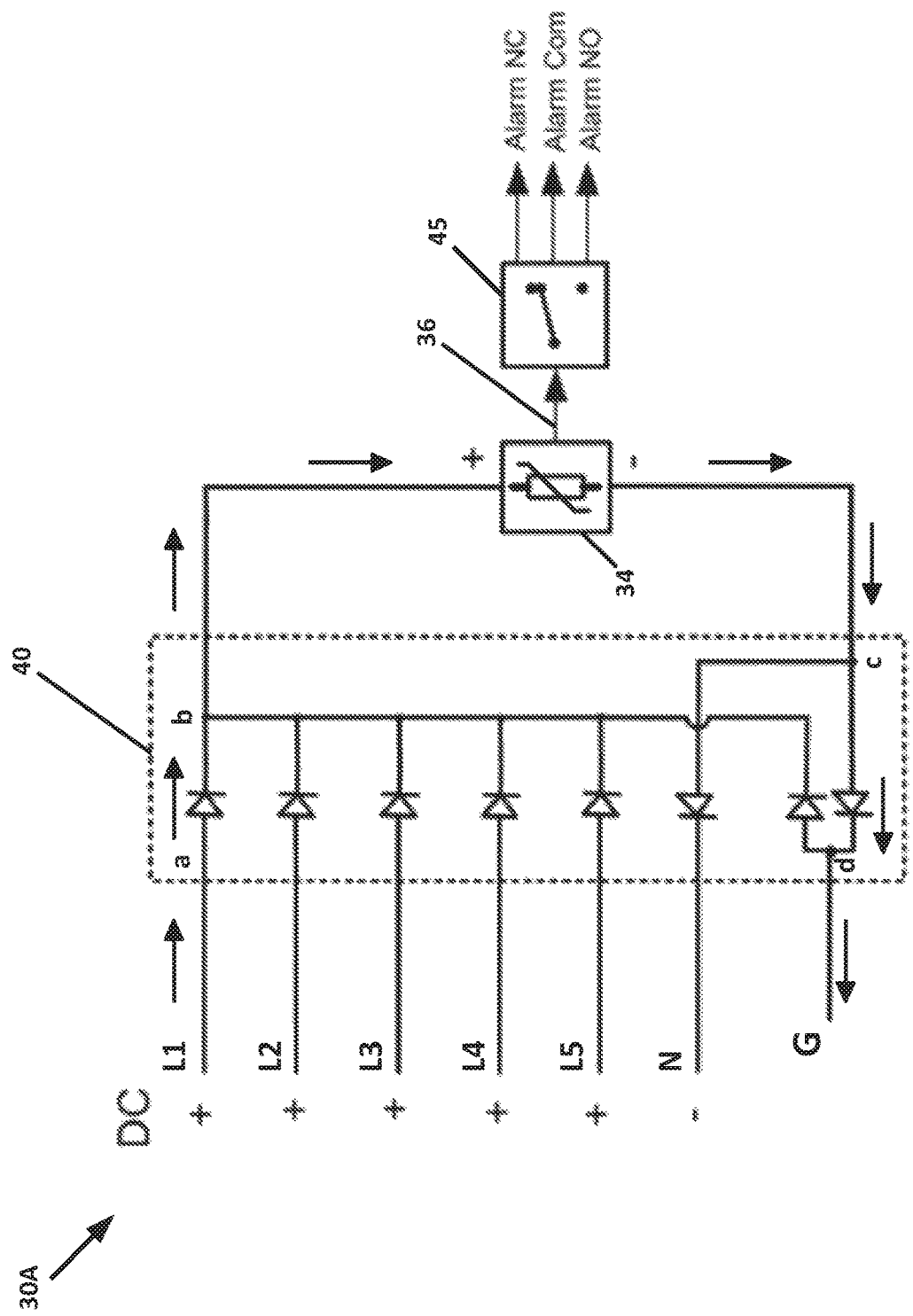
FIG. 4 illustrates the current flow for the SPD shown in FIG. 2 for a positive voltage surge between a DC power line and ground potential G.

Referring now to FIG. 3, there is shown a current flow in SPD 30A in response to a positive voltage surge between a first DC power line (L1) and negative potential N. The current flow along path a-b-c-d is illustrated by arrows. Similarly, FIG. 4 shows a current flow in SPD 30A in response to a positive voltage surge between a first DC power line (L1) and ground potential G. The current flow along path a-b-c-d is illustrated by arrows.

Figure 5:
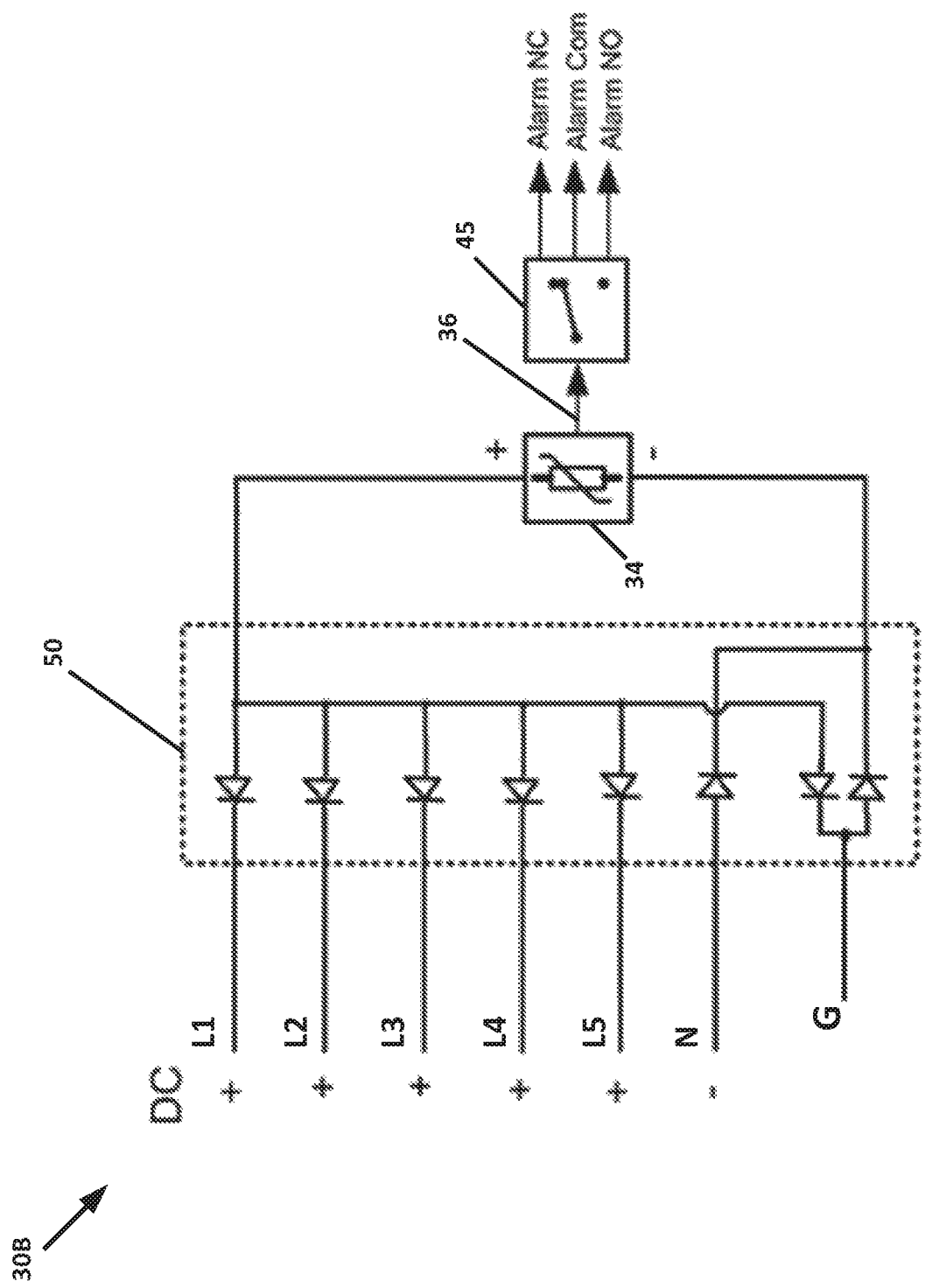
FIG. 5 is a circuit diagram illustrating a SPD according to a second embodiment of the present invention, as configured for protecting a DC power system from negative voltage surges, wherein the DC power system is comprised of a plurality of DC power lines.

FIG. 5 shows an SPD 30B according to a second embodiment of the present invention. As illustrated, SPD 30B is generally comprised of inputs for DC power lines L5, negative potential N, and ground potential G; a rectification circuit 50; a surge protection component 34 having a status output 36; and an alarm circuit 45.

Rectification circuit 50 is comprised of a plurality of diodes associated with the inputs of SPD 30B. The orientation of the anode and cathode terminals of the diodes of rectification circuit 50 are reversed relative to the orientation of the anode and cathode terminals of the diodes of rectification circuit 40, such that SPD 30B is adapted to provide protection from negative voltage surges. The remaining elements of SPD 30B are the same as the elements of SPD 30A described above, and thus, have the same reference numbers.

In the operation of SPD 30B, the diodes of rectification circuit 50 steer overvoltage current above the turn-on threshold of the surge protection component 34 to the one or more surge elements thereof.

Figure 6:
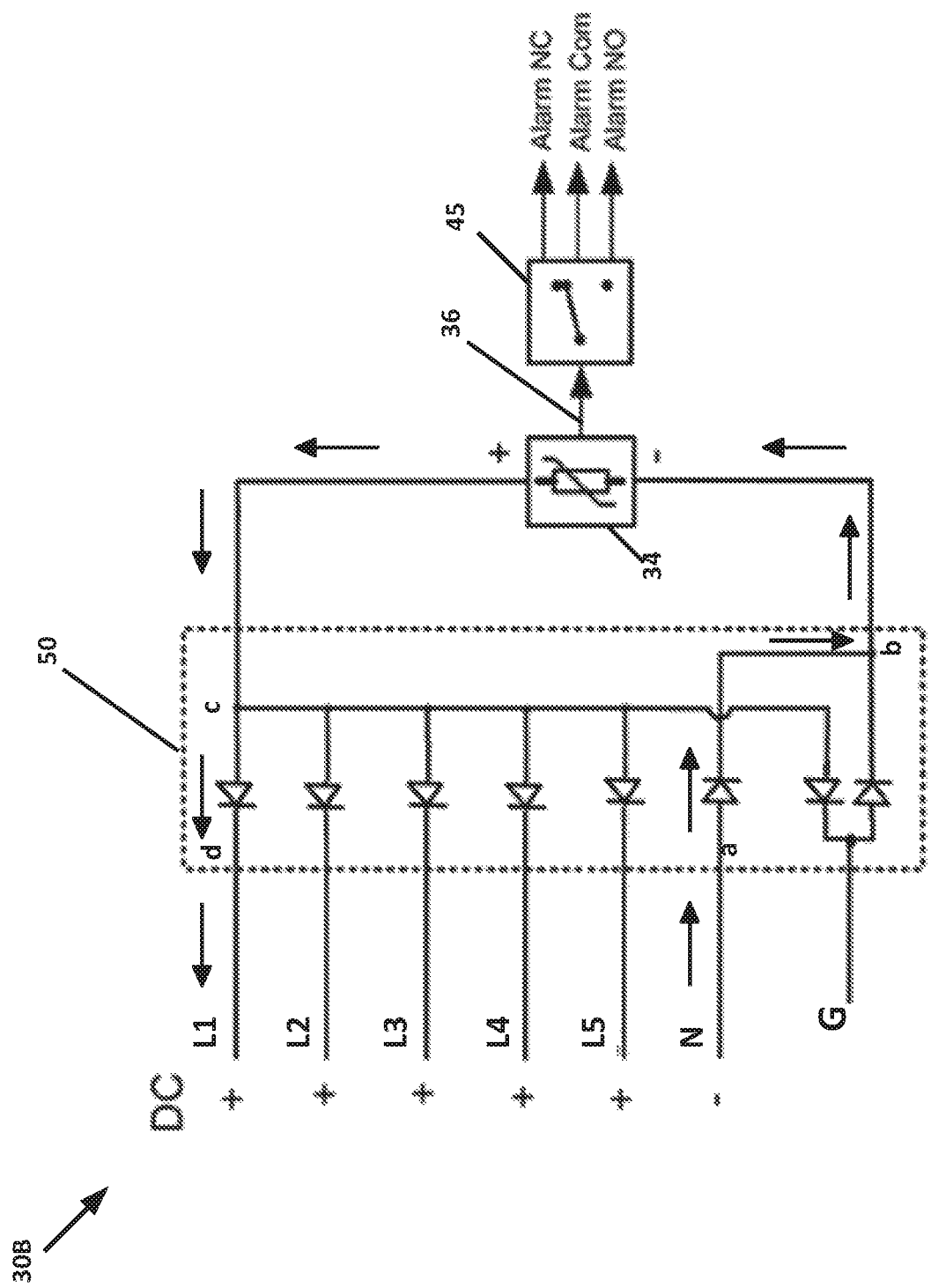
FIG. 6 illustrates the current flow for the SPD shown FIG. 5 for a negative voltage surge between a DC power line and negative potential N.

Referring now to FIG. 6, there is shown a current flow in SPD 30B in response to a negative voltage surge between a first DC power line (L1) and negative potential N. The current flow along path a-b-c-d is illustrated by arrows.

Figure 7:
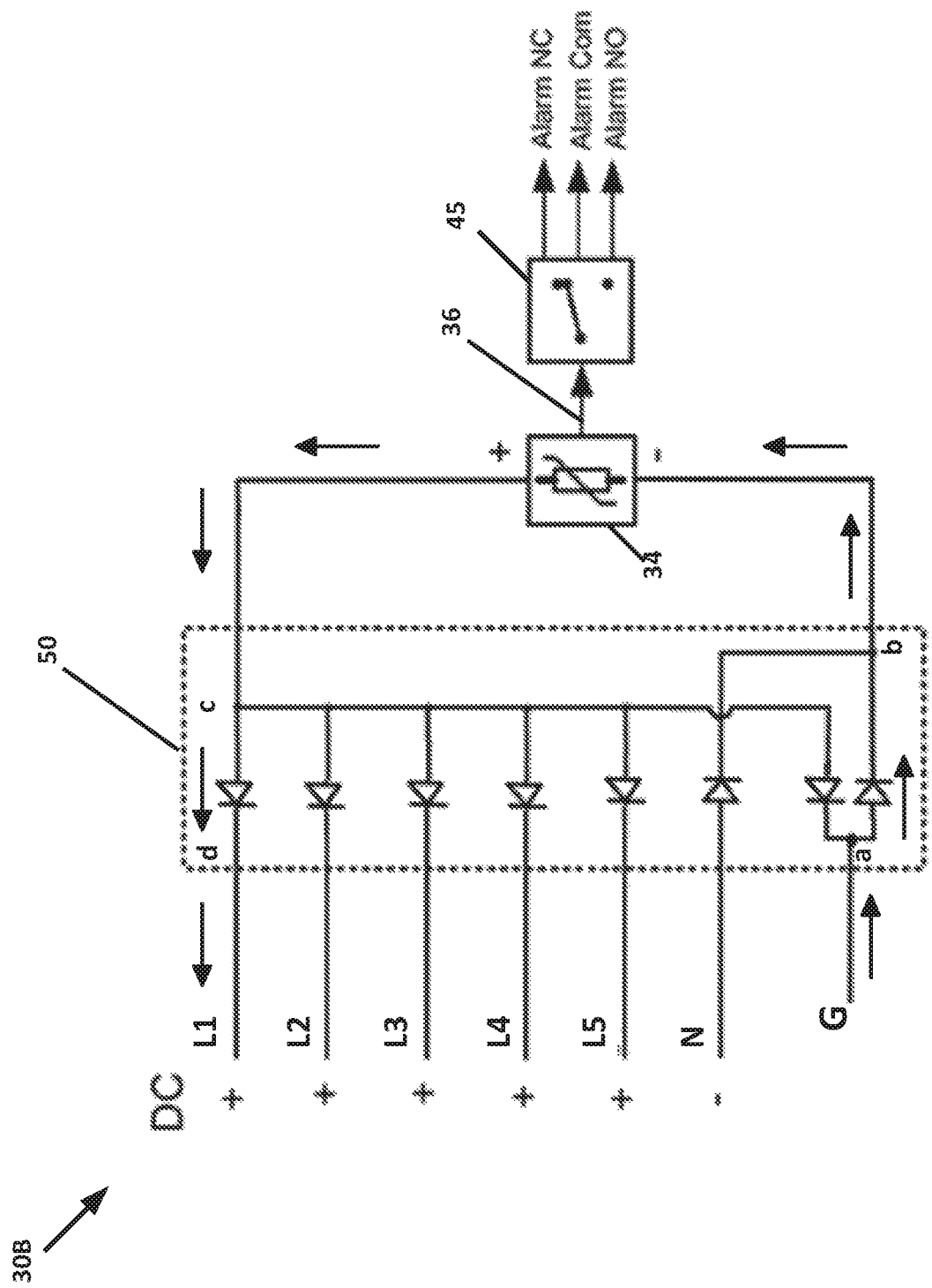
FIG. 7 illustrates the current flow for the SPD shown in FIG. 5 for a negative voltage surge between a DC power line and ground potential G.

Similarly, FIG. 7 shows a current flow in SPD 30B in response to a negative voltage surge between a first DC power line (L1) and ground potential G. The current flow along path a-b-c-d is illustrated by arrows.

Figure 8:
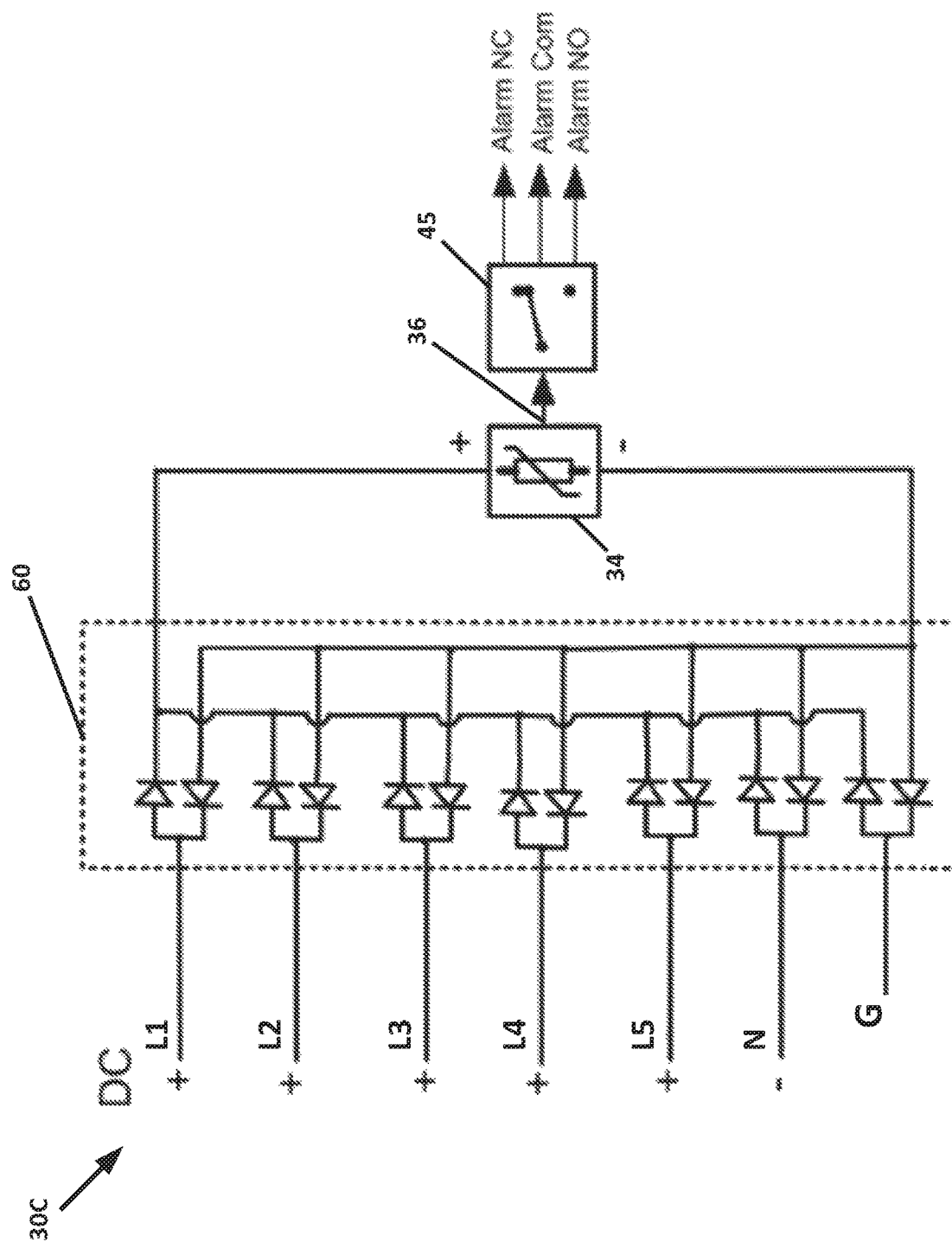
FIG. 8 is a circuit diagram illustrating a SPD according to a third embodiment of the present invention, as configured for protecting a DC power system from both positive and negative voltage surges, wherein the DC power system is comprised of a plurality of DC power lines.

FIG. 8 shows an SPD 30C according to a third embodiment of the present invention. As illustrated, SPD 30C is generally comprised of inputs for DC power lines L1-L5, negative potential N, and ground potential G; a rectification circuit 60; a surge protection component 34 having a status output 36; and an alarm circuit 45.

Rectification circuit 60 is comprised of a plurality of diodes associated with the inputs of SPD 30C. The diodes of rectification circuit 60 are arranged such that SPD 30B is adapted to provide protection from both positive and negative voltage surges. The remaining elements of SPD 30C are the same as the elements of SPDs 30A and 30B described above, and thus, have the same reference numbers.

In the operation of SPD 30C the diodes of rectification circuit 60 steer overvoltage current above the turn-on threshold of the surge protection component 34 to the one or more surge elements thereof.

Figure 9:
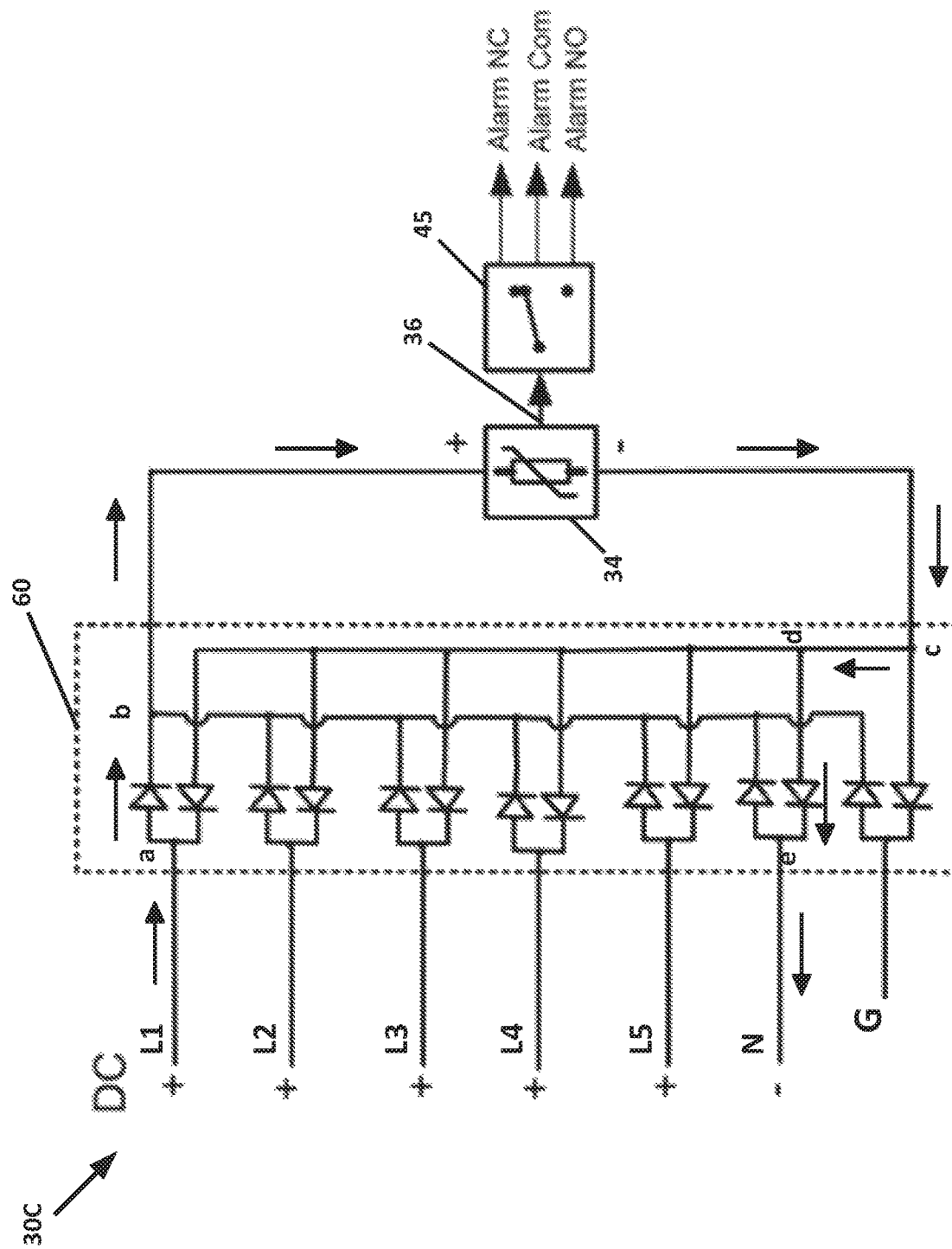
FIG. 9 illustrates the current flow for the SPD shown in FIG. 8 for a positive voltage surge between a DC power line and negative potential N.
Figure 10:
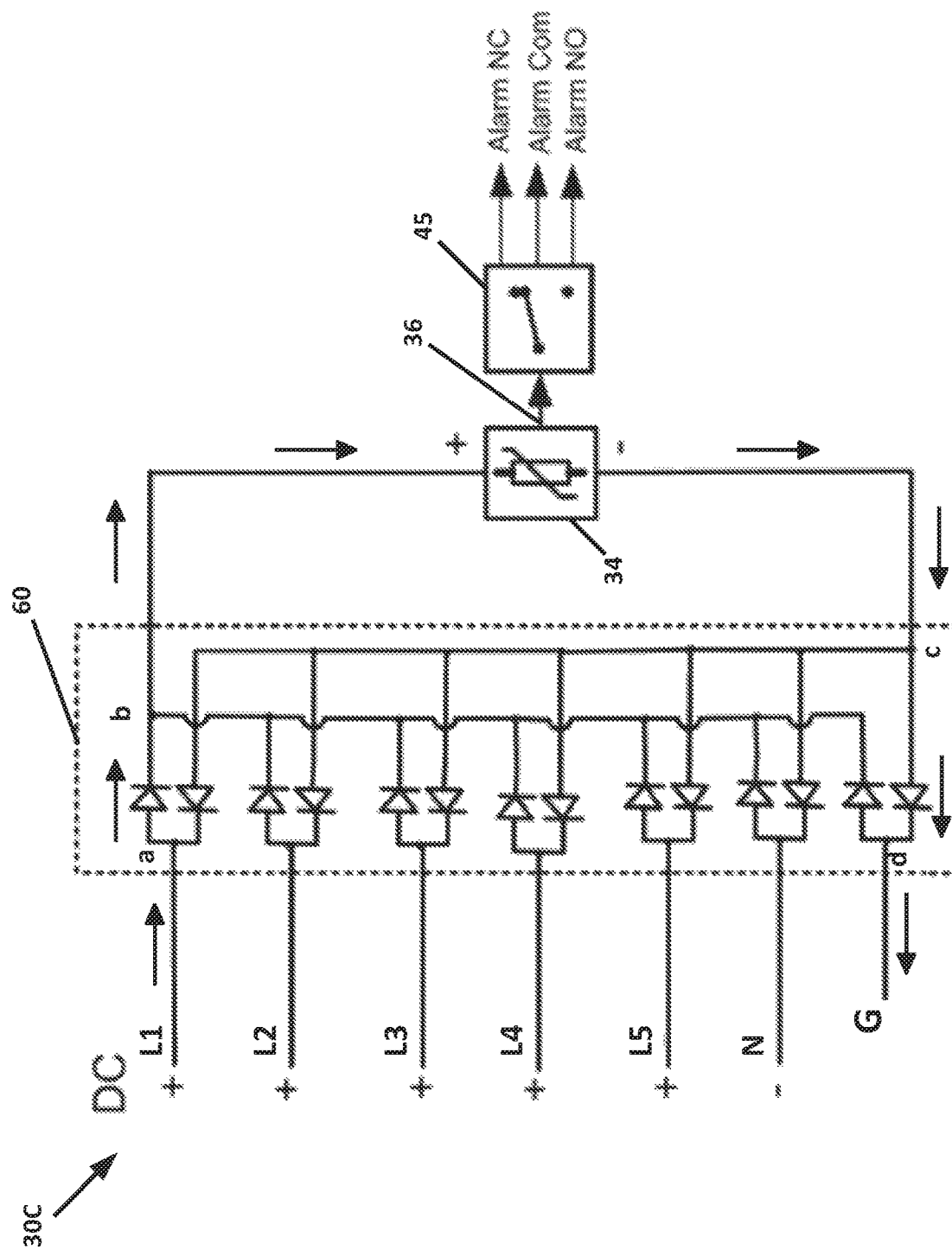
FIG. 10 illustrates the current flow for the SPD shown in FIG. 8 for a positive voltage surge between a DC power line and ground potential G.

Referring now to FIG. 9, there is shown a current flow in SPD 30C in response to a positive voltage surge between a first DC power line (L1) and negative potential N. The current flow along path a-b-c-d-e is illustrated by arrows. Similarly, FIG. 10 shows a current flow in SPD 30C in response to a positive voltage surge between a first DC power line (L1) and ground potential G. The current flow along path a-b-c-d is illustrated by arrows.

Figure 11:
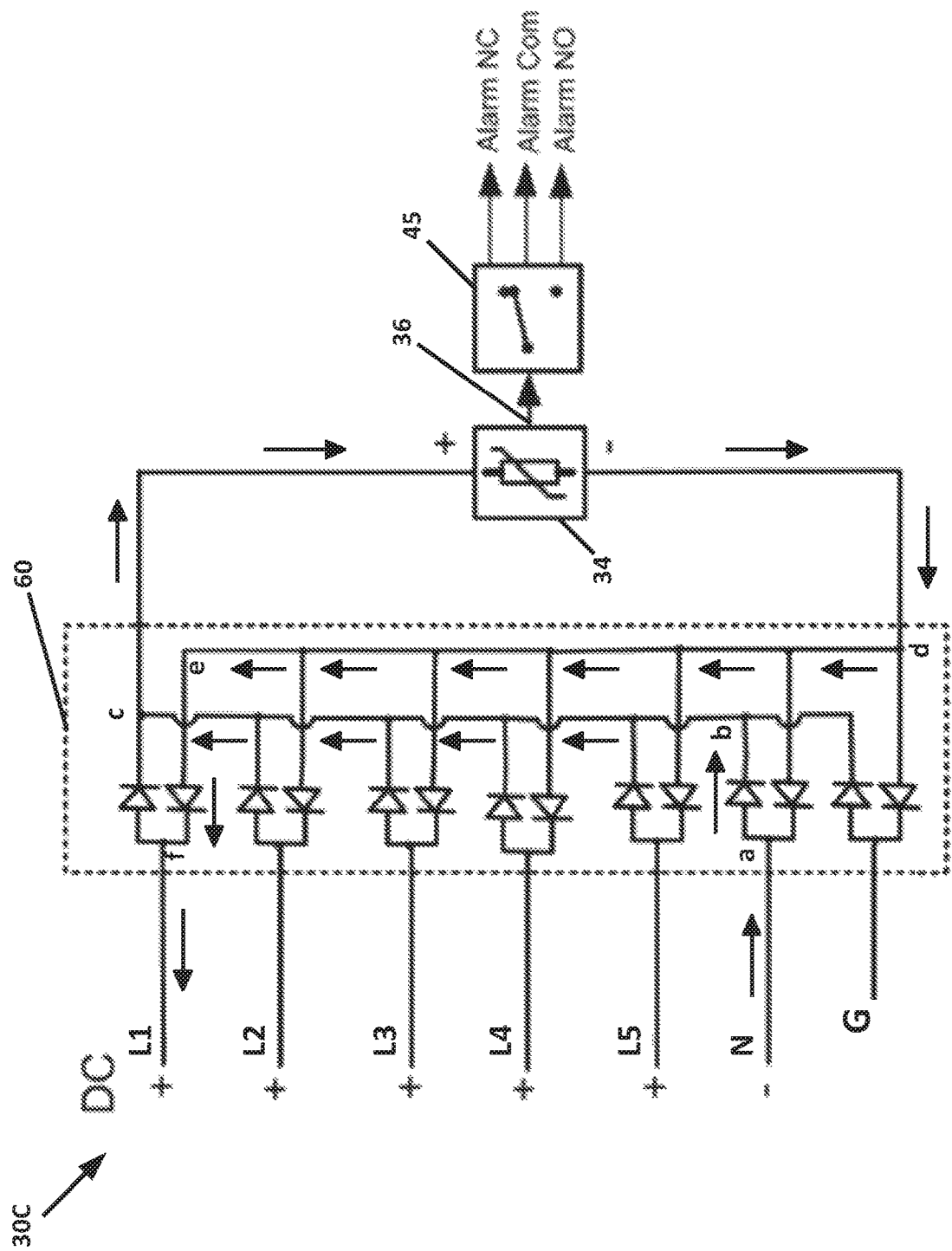
FIG. 11 illustrates the current flow for the SPD shown in FIG. 8 for a negative voltage surge between a DC power line and negative potential N.
Figure 12:
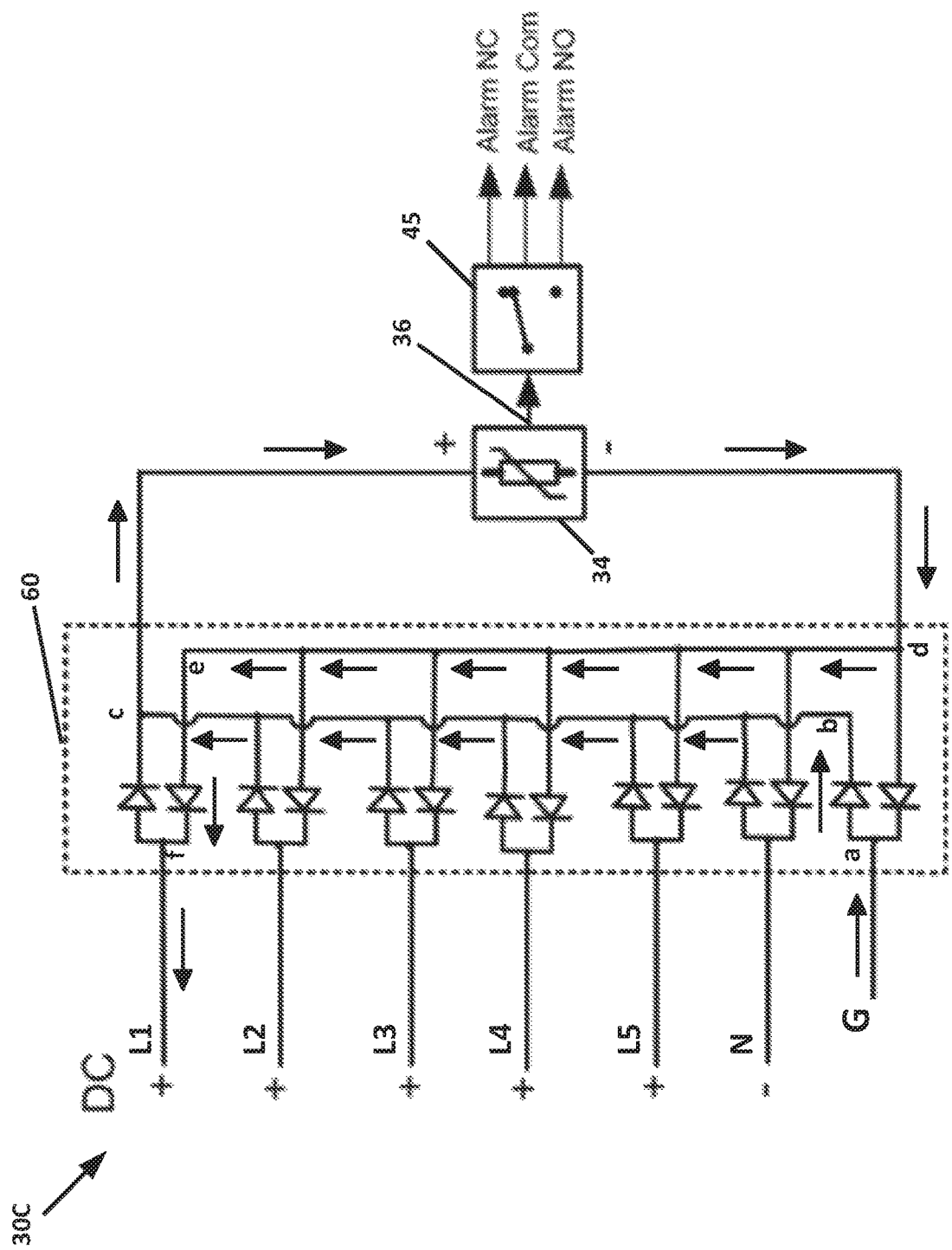
FIG. 12 illustrates the current flow for the SPD shown in FIG. 8 for a negative voltage surge between a DC power line and ground potential G.

Referring now to FIG. 11, there is shown a current flow in SPD 30C in response to a negative voltage surge between a first DC power line (L1) and negative potential N. The current flow along path a-b-c-d-e-f is illustrated by arrows. Similarly, FIG. 12 shows a current flow in SPD 30C in response to a negative voltage surge between a first DC power line (L1) and ground potential G. The current flow along path a-b-c-d-e-f is illustrated by arrows.

While the present invention has been described above in connection with the protection of multiple DC power lines, the present invention is also adaptable for the protection of an AC power system. In the embodiment of the present invention illustrated by FIGS. 13-16, an AC multi-line, multi-phase system is shown.

Figure 13:
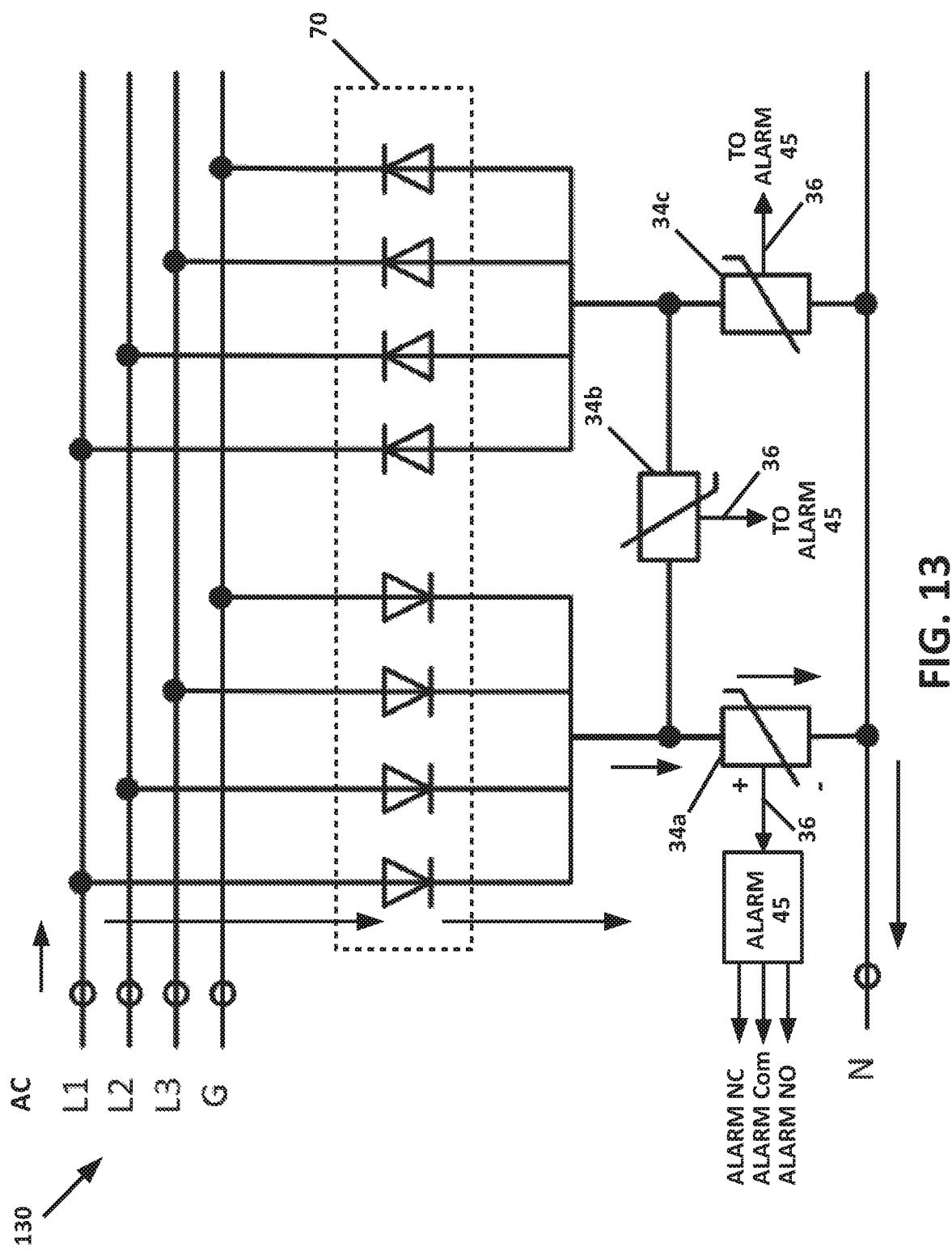
FIG. 13 is a circuit diagram illustrating a SPD according to a fourth embodiment of the present invention, as configured for protecting an AC power system from both positive and negative voltage surges, wherein the AC power system is comprised of a plurality of AC power lines, and wherein there is shown the current flow for a positive voltage surge between an AC power line and neutral N.

FIG. 13 is a circuit diagram illustrating a SPD 130 according to a fourth embodiment of the present invention, as configured for protecting a multi-line AC power system having a plurality of AC power lines. In the illustrated embodiment of the present invention SPD 130 is configured to protect a multiphase AC power system having three AC power lines. It should be appreciated that SPD 130 of the present invention may be alternatively configured for protection of greater or fewer than three AC power lines.

As illustrated, SPD 130 is generally comprised of inputs for (i) AC power lines L1-L3, (ii) ground potential G, and (iii) neutral N; a rectification circuit 70; surge protection components 34a, 34b, and 34c having a respective status output 36; and an alarm circuit 45. SPD 130 is adapted to handle both positive and negative voltage surges.

Rectification circuit 70 is comprised of a plurality of diodes associated with L1, L2, L3 and G of SPD 130. The anode and cathode terminals of the diodes are oriented such that SPD 130 is adapted to provide protection from both positive and negative voltage surges.

Each surge protection component 34a, 34b, 34c is comprised of one or more surge elements. In the illustrated embodiment, the surge element takes the form of a single metal oxide varistor (MOV). However, it should be appreciated that the surge element of surge protection components 34a, 34b, 34c may take other forms; including, but not limited to, a transient voltage suppressor (TVS) diode, a thyristor surge protection device (TSPD), a gas discharge tube (GDT), a spark gap overvoltage suppressor, and the like. It should be understood that each surge protection component 34a, 34b, 34c may be comprised of a plurality of surge elements connected in series, parallel, or a combination of series/parallel to achieve a particular surge rating.

In the operation of SPD 130, the diodes of rectification circuit 70 steer overvoltage current above the turn-on threshold of the surge protection components 34a, 34b, 34c to the one or more surge elements thereof.

In the illustrated embodiment, alarm circuit 45 is configured with normally closed (NC), common, and normally open (NO) outputs for connection with a remote status indicator used to provide a visual and/or audible alarm to alert the user of a surge event.

Figure 14:
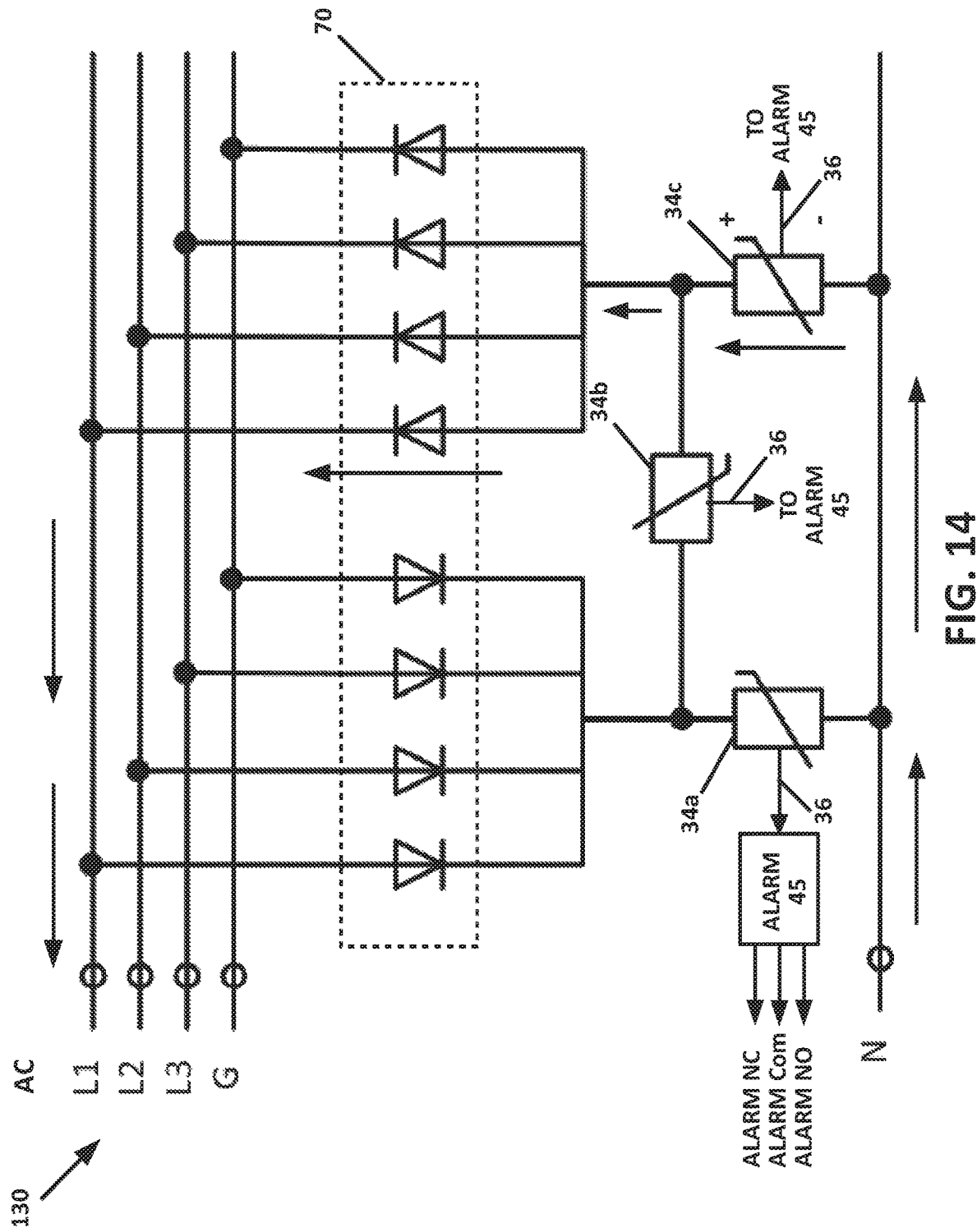
FIG. 14 illustrates the current flow for the SPD shown in FIG. 13 for a negative voltage surge between an AC power line and neutral N.

FIG. 13 is illustrated to show a current flow in SPD 130 in response to a positive voltage surge between a first AC power line (L1) and neutral N. The current flow path is illustrated by arrows. Similarly, FIG. 14 is illustrated to show a current flow in SPD 130 in response to a negative voltage surge between a first AC power line (L1) and neutral N.

Figure 15:
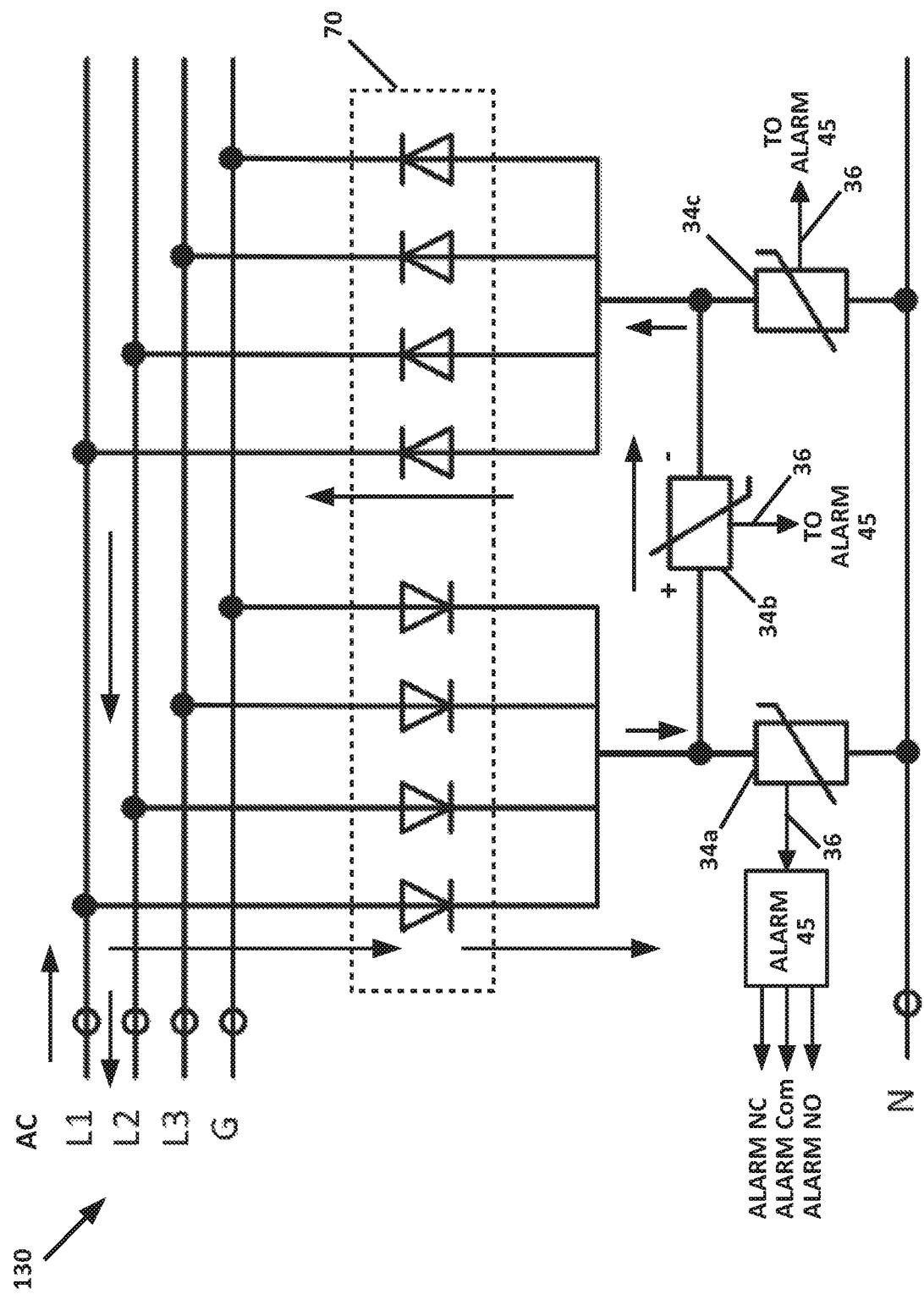
FIG. 15 illustrates the current flow for the SPD shown in FIG. 13 for a positive voltage surge between two AC power lines.

FIG. 15 is illustrated to show a current flow in SPD 130 in response to a positive voltage surge between a first AC power line (L1) and a second AC power line (L2).

Figure 16:
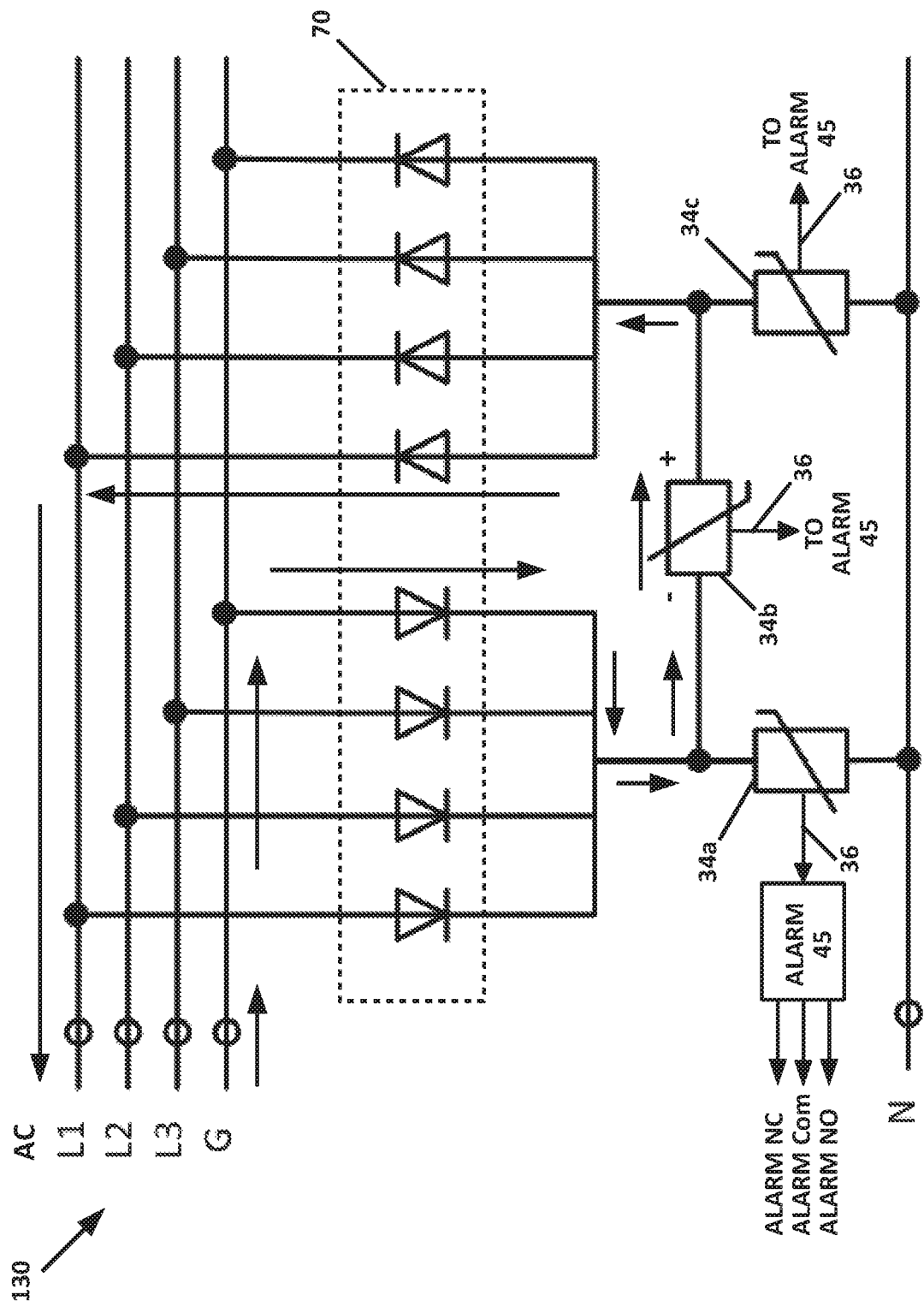
FIG. 16 illustrates the current flow for the SPD shown in FIG. 13 for a negative voltage surge between an AC power line and ground.

FIG. 16 is illustrated to show a current flow in SPD 130 in response to a negative voltage surge between a first AC power line (L1) and ground potential G.

It should be appreciated from the illustrated examples of positive and negative voltage surge conditions for SPD 130 that surge protection component 34a is used for protection when there is a positive voltage surge between (i) L1, L2, L3, or G and (ii) N; that surge protection component 34c is used for protection when there is a negative voltage surge between (i) L1, L2, L3, or G and (ii) N; and that surge protection component 34b is used for protection when there is a negative or positive voltage surge between any pair of inputs L1, L2, L3, and G.

The foregoing describes specific embodiments of the present invention. It should be appreciated that these embodiments are described for purposes of illustration only, and that numerous alterations and modifications may be practiced by those skilled in the art without departing from the spirit and scope of the invention. For example, it is contemplated that the number of power lines protected by the SPD disclosed herein may vary from the number of power lines of the illustrated embodiments. It is also contemplated that there may be a plurality of surge elements for the surge protection component disclosed. It is intended that all such modifications and alterations be included insofar as they come within the scope of the invention as claimed or the equivalents thereof.

Having described the invention, the following is claimed:

1. A surge protection device, comprising:
   a plurality of direct current (DC) power line inputs;
   a negative potential input independent from the plurality of DC power line inputs or a neutral input independent from the plurality of DC power line inputs;
   a ground potential input independent from the plurality of DC power line inputs;
   a surge protection component having one or more surge elements; and
   a rectification circuit including a plurality of diodes, wherein said rectification circuit is connected between said inputs and the surge protection component, wherein the negative potential or neutral input is connected to a cathode of one of the plurality of diodes, and an anode of the one of the plurality of diodes is connected to the surge protection component.

2. The surge protection device according to claim 1, wherein said device further comprises:
an alarm circuit for receiving a status output from the surge protection component.

3. The surge protection device according to claim 1, wherein said rectification circuit steers overvoltage current above a turn-on threshold of the surge protection component to the one or more surge elements thereof, in response to a positive voltage surge.

4. The surge protection device according to claim 1, wherein said rectification circuit steers overvoltage current above a turn-on threshold of the surge protection component to the one or more surge elements thereof, in response to a negative voltage surge.

5. The surge protection device according to claim 1, wherein said rectification circuit steers overvoltage current above a turn-on threshold of the surge protection component to the one or more surge elements thereof, in response to a positive or negative voltage surge.

6. The surge protection device according to claim 1, wherein said one or more surge elements of the surge protection component are selected from the following: metal oxide varistor (MOV), a transient voltage suppressor (TVS) diode, a thyristor surge protection device (TSPD), a gas discharge tube (GDT), and a spark gap overvoltage suppressor.

7. The surge protection device according to claim 1, wherein surge protection component includes a plurality of surge elements connected in series, parallel, or a combination of series and parallel.

8. The surge protection device according to claim 2, wherein the alarm circuit includes a normally closed (NC) output, a common output, and a normally open (NO) output for connection with a remote status indicator to provide a visual and/or audible alarm in response to a voltage surge.

9. The surge protection device according to claim 1, wherein each of the plurality of power line inputs is connected to an anode of a respective input diode of the plurality of diodes, and cathodes of each input diode one of the plurality of diodes are electrically connected to the surge protection component.

10. The surge protection device according to claim 9, wherein a cathode of the first diode is connected to a cathode of the input diodes.

11. The surge protection device according to claim 1, wherein each DC power line input is connected to a respective diode of the plurality of diodes, and at least one of i) a cathode of each respective diode is connected to the surge protection component or ii) an anode of each respective diode is connected to the surge protection component.

12. A surge protection device, comprising:
a plurality of direct current (DC) power line inputs;
a negative potential input independent from the plurality of DC power line inputs or a neutral input independent from the plurality of DC power line inputs;
a ground potential input independent from the plurality of DC power line inputs;
a surge protection component having one or more surge elements; and
a rectification circuit including a plurality of diodes, wherein said rectification circuit is connected between said inputs and the surge protection component, wherein the ground potential input is connected to an anode of a first diode of the plurality of diodes and to a cathode of a second diode of the plurality of diodes, and an anode of the second diode is connected to the surge protection component.

13. A surge protection device, comprising:
a plurality of direct current (DC) power line inputs;
a negative potential input independent from the plurality of DC power line inputs or a neutral input independent from the plurality of DC power line inputs;
a ground potential input independent from the plurality of DC power line inputs;
a surge protection component having one or more surge elements; and
a rectification circuit including a plurality of diodes, wherein said rectification circuit is connected between said inputs and the surge protection component, wherein the ground potential input is connected to a cathode of a first diode of the plurality of diodes and to an anode of a second diode of the plurality of diodes, and a cathode of the second diode is connected to the surge protection component.

* * * * *